United States Patent
Reinders et al.

(10) Patent No.: US 10,898,849 B2
(45) Date of Patent: Jan. 26, 2021

(54) SMART DEHUMIDIFIER

(71) Applicant: Oxycom Beheer B.V., Raalte (NL)

(72) Inventors: Johannes Antonius Maria Reinders, Warnsveld (NL); Alexander John Banz, St-Prex (CH); Mark Hakbijl, Zwolle (NL)

(73) Assignee: Oxycom Beheer B.V., Raalte (NL)

( * ) Notice: Subject to any disclaimer, the term of this patent is extended or adjusted under 35 U.S.C. 154(b) by 204 days.

(21) Appl. No.: 16/082,541

(22) PCT Filed: Mar. 17, 2017

(86) PCT No.: PCT/NL2017/050169
§ 371 (c)(1),
(2) Date: Sep. 6, 2018

(87) PCT Pub. No.: WO2017/160151
PCT Pub. Date: Sep. 21, 2017

(65) Prior Publication Data
US 2019/0046918 A1 Feb. 14, 2019

(30) Foreign Application Priority Data
Mar. 18, 2016 (NL) ...................................... 2016458

(51) Int. Cl.
*B01D 53/04* (2006.01)
*B01D 53/26* (2006.01)
*B01D 53/28* (2006.01)

(52) U.S. Cl.
CPC ....... *B01D 53/0438* (2013.01); *B01D 53/261* (2013.01); *B01D 53/263* (2013.01);
(Continued)

(58) Field of Classification Search
CPC .. B01D 53/03; B01D 53/0438; B01D 53/261; B01D 53/263; B01D 53/28;
(Continued)

(56) References Cited

U.S. PATENT DOCUMENTS

| 4,469,746 A | 9/1984 | Weisman et al. |
| 5,133,878 A | 7/1992 | Gsell et al. |

(Continued)

FOREIGN PATENT DOCUMENTS

| EP | 501301 A2 | 9/1992 |
| EP | 1840486 A1 | 10/2007 |

(Continued)

OTHER PUBLICATIONS

International Search Report of PCT/NL2017/050169 dated Aug. 22, 2017.
(Continued)

*Primary Examiner* — Frank M Lawrence, Jr.
(74) *Attorney, Agent, or Firm* — N.V. Nederlandsch Octrooibureau; Catherine A. Shultz; Katelyn J. Bernier

(57) ABSTRACT

A device is disclosed for extracting water from a fluid medium. The water extracting device comprises a primary channel and a quantity of a light-activated, stimulus responsive polymer (SRP) supported on a carrier within the primary channel. The SRP is capable of absorbing a quantity of water from the medium in a first state and releasing the water in a second state and vice versa. An illumination arrangement allows selective exposure of the SRP within the primary channel to electromagnetic radiation to switch the SRP between the first state and the second state whereby water absorbed by the SRP is released. Also disclosed is a method and device for conducting heat from the primary channel to a secondary channel, adjacent to and in heat conducting relation with the primary channel.

16 Claims, 9 Drawing Sheets

(52) U.S. Cl.
CPC ........ B01D 53/28 (2013.01); *B01D 2253/202* (2013.01); *B01D 2253/25* (2013.01); *B01D 2253/34* (2013.01); *B01D 2259/40083* (2013.01); *B01D 2259/80* (2013.01); *B01D 2259/802* (2013.01); *B01D 2259/804* (2013.01)

(58) Field of Classification Search
CPC .......... B01D 2253/202; B01D 2253/25; B01D 2253/34; B01D 2259/80; B01D 2259/802; B01D 2259/804; B01D 2259/40083
USPC .... 95/114, 115, 117, 121, 126; 96/121, 126, 96/143, 146, 152, 154
See application file for complete search history.

(56) References Cited

U.S. PATENT DOCUMENTS

| | | | | |
|---|---|---|---|---|
| 5,534,186 | A * | 7/1996 | Walker | B01D 53/261 252/194 |
| 6,050,100 | A | 4/2000 | Belding et al. | |
| 7,264,649 | B1 | 9/2007 | Johnson et al. | |
| 7,704,305 | B2 * | 4/2010 | Nishida | B01D 53/261 96/154 |
| 9,211,499 | B2 | 12/2015 | Jangbarwala | |
| 2002/0035924 | A1 | 3/2002 | Keefer | |
| 2006/0091228 | A1 | 5/2006 | Hsu et al. | |
| 2008/0102744 | A1 | 5/2008 | Moore et al. | |
| 2012/0071609 | A1 * | 3/2012 | Savla | C08F 220/06 525/329.4 |
| 2013/0309927 | A1 * | 11/2013 | Jangbarwala | B01J 20/28047 442/119 |
| 2014/0174295 | A1 | 6/2014 | Tai et al. | |
| 2016/0244548 | A1 * | 8/2016 | Boniface | B01J 20/3259 |
| 2017/0065930 | A1 * | 3/2017 | Sakikawa | B01J 20/3483 |
| 2017/0266610 | A1 * | 9/2017 | Sakikawa | B01J 20/261 |
| 2017/0276380 | A1 * | 9/2017 | Sakikawa | B01D 53/263 |
| 2018/0050298 | A1 * | 2/2018 | Sakikawa | B01J 20/28 |
| 2018/0071676 | A1 * | 3/2018 | Sakikawa | B01D 53/261 |

FOREIGN PATENT DOCUMENTS

| | | |
|---|---|---|
| WO | 2003091633 A1 | 11/2003 |
| WO | 2007026023 A1 | 3/2007 |
| WO | 2007043863 A1 | 4/2007 |
| WO | 2007061298 A1 | 5/2007 |
| WO | 2008055981 A1 | 5/2008 |
| WO | 2012000084 A1 | 1/2012 |
| WO | 2012050084 A1 | 4/2012 |
| WO | 2015037996 A1 | 3/2015 |

OTHER PUBLICATIONS

Dutch Search Report of NL2016458 dated Jan. 31, 2017.
Aseyev, Vladimir et al, Non-ionic Thermoresponsive Polymers in Water, Adv. Polym. Sci. (2011).
Klajn, Rafal, Spiropyran-based dynamic materials, Chem. Soc. Rev., 2014.
Satoh, Taku et al, Fast-reversible light-driven . . . , Soft Matter, The Royal Society of Chemistry 2011.
Satoh, Taku et al, Isomerization of spirobenzopyrans . . . , Phys. Chem. Chem. Phys., the Owner Societies 2011.
Stumpel, Jelle E. et al, Stimuli-responsive photonic polymer coatings, Chem. Commun., The Royal Society of Chemistry 2014.
Stumpel, Jelle E. et al, Photoswitchable Ratchet Surface Topographies . . . , American Chemical Society 2014.
Stumpel, Jelle E., Thesis, Responsive polymer photonics, 2014.
Yang, Helen et al, Temperature-Triggered Collection . . . , Advanced Materials, Wiley-VCH Verlag GmbH & Co. KGaA, Weinheim 2013.
Ziolkowski, Bartosz et al, Self-protonating spiropyran-co-NIPAM-co-acrylic . . . , Soft Matter, The Royal Society of Chemistry 2013.
Lantor nl. Cable Products, Product data sheet 3C7020, Semi conductive nonwoven tape, Issue date: Apr. 1998, rev. date: Dec. 2010.

* cited by examiner

SMART DEHUMIDIFIER

BACKGROUND OF THE INVENTION

1. Field of the Invention

The present invention relates to water extracting devices, in particular, to devices for the removal of water from a medium using smart polymer materials and subsequent release of the water under the influence of a stimulus. The invention also relates to a system incorporating such a device and a method of extracting water vapour from an air stream.

2. Description of the Related Art

Vapour extraction devices are conventionally used in many situations where it is desired to reduce the vapour content of or otherwise dry an air stream. In particular, in heating, ventilating and air conditioning systems removal of excess moisture from an air stream is often desirable. Other situations where water vapour may be extracted include clothes dryers, industrial desiccation and dehumidifiers. There are also many situations where the extraction of water from a water transporting medium may be desirable for the sake of the water itself. This is particularly the case in countries where water is scarce but may also be relevant in such diverse situations as space exploration and other closed systems.

One form of vapour extracting device is known as a desiccant wheel and uses a desiccant such as silica gel to absorb moisture. The desiccant is provided on a carrier layer, convoluted or corrugated to form a multitude of passages having a large surface area. The carrier layer is rolled up or otherwise arranged to form a wheel-shaped structure with the passages aligned with an axis of the wheel. In use, the air to be dried is passed through a first sector of the wheel as a first air stream. The desiccant has a greater affinity to water than does the air and moisture in the air is taken up by the desiccant. Silica gel in particular is extremely effective in that it can absorb many times its own weight in water until it finally becomes saturated. During operation, the wheel turns and the parts of the wheel that have become saturated rotate out of the first air stream. They are then exposed to a second stream of high temperature air. The second air stream operates to dry the desiccant by effectively boiling off the absorbed water. Considerable energy, equal to the latent heat of evaporation, is required in order to evaporate this water. Such desiccant devices are also generally relatively large and cumbersome. It is also not possible to recover the water without additional steps. More recently, alternative (smart) materials have been discovered that are capable of selectively absorbing particular substances and releasing them in response to a stimulus. One class of such materials are referred to as LCST polymers. These materials are known for their ability to change state at the so-called Lower Critical Solution Temperature (LCST) in response to a thermal stimulus. Polymers exhibiting an LCST in water change from a relatively hydrophilic to a relatively hydrophobic form when the temperature is increased to above the LCST. At present these polymers have been used primarily for bio-medical purposes. An example of such materials is given in EP 501 301, the contents of which are herein incorporated by reference in their entirety. It has been suggested that such materials could be used for extracting water entrained in a flow of humid air. A vapour extraction device has been disclosed in WO2007/026023, the contents of which are also herein incorporated by reference in their entirety. Although the principle of operation shows great promise, the practicalities of implementation have, until now, been difficult to overcome. In particular, the cost of such materials is high and their effective incorporation into existing devices has not been realised.

A further device is disclosed in WO2015/037996, the contents of which are also herein incorporated by reference in their entirety, which teaches the use of an LCST material grafted onto textile fibres in order to provide increased surface area and greater water absorption capacity. The document also considers how water vapour extraction could be useful in the field of evaporative cooling systems. Evaporative cooling systems make use of the latent heat of evaporation of water into an air stream to extract heat. Indirect evaporative coolers and "dew-point coolers" cool a product air stream by evaporation into a working air stream. If the working air stream already has high relative humidity, then the amount of water vapour that it can absorb is limited. Although WO2015/037996 considers ways in which moisture can be absorbed, the heat of absorption of the moisture remains a difficulty that can cause the air flow to be heated to as much as 80° C. Depending upon the level of the LCST temperature, this can be problematic and prevent effective and efficient operation. It would therefore be desirable to provide an efficient manner of reducing the humidity an air stream while avoiding sensitivity to temperature.

There is thus a need for alternative vapour extracting or dehumidification device that can operate while being less sensitive to temperature considerations. Such devices should be cheap and simple to produce and also be relatively small for better integration into existing systems.

BRIEF SUMMARY OF THE INVENTION

According to the invention there is provided a device for extracting water from a fluid stream that alleviates some of the above-mentioned drawbacks. The water extracting device comprises: a primary channel for passage of a water transporting medium; a quantity of a stimulus responsive polymer (SRP) supported on a carrier within the primary channel, the SRP being capable of absorbing a quantity of water from the medium in a first state and releasing the water in a second state and vice versa; and an illumination arrangement allowing selective exposure of the SRP within the primary channel to electromagnetic radiation to switch the SRP between the first state and the second state whereby water absorbed by the SRP is released. In order for it to be able to switch from the first state to the second state in response to illumination by electromagnetic radiation, the SRP should be responsive to electromagnetic radiation such as for example visible light. It is however not excluded that the SRP is also responsive to other stimuli or that it may change from the first to the second state in response to a certain stimulus or stimuli and from the second state to the first state in response to a different stimulus or stimuli.

In one embodiment, the carrier comprises a fibrous material and the SRP is present as a coating on the individual fibres. By providing the SRP as a coating onto the fibres, an increased surface area may be achieved and the ability of the SRP to absorb water is augmented by the physical form of the fibres, which are able to retain water by surface tension effects.

Additionally or alternatively, the carrier may comprise a shape-retaining supporting structure. This may support the fibrous material mentioned above on its surface. In that case, the carrier structure may be any appropriate structure that can support the fibres to perform their function. In general the supporting structure will be a separate layer although it may also be in the form of a skeleton on which the fibres are arranged. The supporting structure may be a foil or gauze and may be formed of e.g. a metal or a plastics material. Paper or carton may also be used. Alternatively, the supporting structure may directly support the SRP on its surface.

In one embodiment, the supporting structure may comprise a plurality of fins over which the water transporting medium can flow and the SRP may be provided on the fins, either directly or as a coating on a fibrous material layer applied to the fins. Experience in developing heat exchangers has shown how the use of such fins may be advantageous both in terms of increasing the surface area for heat exchange and also in encouraging flow disruption and turbulent flow, resulting in better heat and moisture transfer through the boundary layers. The supporting structure may also be provided with a heating provision or heating layer for application of heat to the SRP.

The water transporting medium may be any suitable medium from which it is desired to extract or separate water, in particular air or other gases. It is however not excluded that it may also be a liquid or an emulsion or any other fluid. It will be understood that removal of liquid water from a liquid or even the removal of nebulized liquid water from a gas, may not require a phase change on absorption by the SRP, whereby lesser amounts of latent heat may be evolved. In the following discussion, reference is made to the case of removal of water vapour from air but this is not intended to be limiting and the skilled person will recognise the changes needed to adapt the principles to other fluids. It is also not excluded that the same configurations and principles may be used with other smart polymers to selectively extract other substances from a flow of media.

In one preferred embodiment, the supporting structure comprises a conducting metal foil of e.g. aluminium. A particular advantage of such a foil is that it allows the device to be readily formed into complex shapes such as the fins mentioned above, using conventional forming processes such as rolling, stamping or the like. Another advantage of a conducting metal foil is that it can also be used for heat transfer. This permits the device to be multifunctional both in extracting moisture and also in transferring heat that may be associated with such absorption. It also allows a heating provision to be applied to the supporting structure, for heating the SRP should this be required.

In an embodiment, the device comprises means to conduct heat from an interior of the primary channel to an exterior of the channel. It will be understood that operation of the device to absorb water vapour can lead to a significant release of heat due to the latent heat that is released as the water vapour is absorbed by the SRP. By providing means to conduct this heat away, the temperature within the primary channel may be kept as constant as possible and at least away from the LCST. Any suitable means to conduct this heat away may be envisaged, including heat tubes, fins, conducting walls and the like. In a preferred embodiment, adjacent channels may be provided through which first and second media flows may pass in heat exchanging relation. Heat conducting fins may be provided for conducting heat from the primary channel to the secondary channel. The SRP may be provided as a coating on the fins in the primary channel either directly of on a fibrous layer applied to the fins.

According to a particularly important aspect of the invention, the carrier structure may comprise a plurality of fins and the fibrous material is provided on the fins. The provision of a fin structure increases further the ability of the device to quickly take up water by increasing the mass transfer between an air supply across the device and the SRP provided on the carrier structure. Various fin structures may be envisaged but most preferably, the fins are deformed from a flat sheet or plate such as that disclosed in WO2008055981, the contents of which are herein incorporated by reference in their entirety. The fibrous material with SRP thereon may be provided on either one or both surfaces of the carrier structure.

In an alternative embodiment the supporting structure may comprise an insulating foil. The insulating foil may be thermally insulating and/or electrically insulating. Preferably the insulating foil is formed of plastics material. For alternative or additional regeneration of the SRP material, a high resistance heating element may be formed onto the supporting structure, which due to its electrically insulating nature will not allow short circuit of the heating element. The skilled person will be well aware of the properties and advantages that may be achieved by the use of such plastics.

The SRP material is relatively hydrophilic in the first state and relatively hydrophobic in the second state. In certain contexts, this may even be referred to as superhydrophilic/superhydrophobic. After absorbing water vapour in the first state the material releases liquid water on switching to the second state. Of particular significance in this case, the phase change from vapour to liquid takes place on absorption of the vapour by the material and is not reversed on releasing the water on switching to the second state. The energy required to release the water from the material on switching may thus be considerably less than the energy required to evaporate a similar quantity of water from a silica gel or similar desiccant.

As indicated above, the term SRP is intended to denote a stimulus responsive polymer, which in a first embodiment of the invention is an EM radiation SRP. In another embodiment of the invention, the material may switch from the first state to the second state in response to heat. One such polymer is referred to as an LCST-type polymer. In the context of the present invention, LCST-type polymers are thermo-responsive polymers that exhibit a LCST in or with water. These materials are known for their ability to reversibly change state at the so-called Lower Critical Solution Temperature (LCST) in response to a thermal stimulus from a relatively hydrophilic form below the LCST to a relatively hydrophobic form above the LCST.

Thermo-responsive polymers exhibiting a LCST in or with water are well-known in the art. In this respect, reference is made to V. Aseyev, H. Tenhu, F. M. Winnik, Non-ionic Thermoresponsive Polymers in Water, *Adv. Polym. Sci.*, 242, 2010, pp 29-89, which is incorporated herein by reference in its entirety. Examples of thermo-responsive polymers having a LCST that can be applied as a SRP in the devices and methods of the present invention are N-substituted poly(acrylamides) and N-substituted poly (methacrylamides) such as poly(N-ethylacrylamide), poly (N-ethylmethacrylamide), poly(N,N'-ethylmethylacrylamide), poly(N,N'-diethylacrylamide), poly(N-n-propylacrylamide), poly(N-n-propylmethacrylamide), poly (N-isopropylacrylamide), poly(N-isopropylmethacrylamide), poly(N-cyclopropylacrylamide), poly(N-(L)-(1-hydroxymethyl)propylmethacrylamide), poly(N-acryloylpyrrolidine) and poly(N-acryloylpiperidine), poly(N-vinyl amides) such as poly(N-vinyl caprolactam), poly(N-vinyl propylacetamide), poly(N-vinyl-5-methyl-2-oxazolidone) and poly(N-vinyl isobutyramide), protein-related polymers such as poly(L-proline), poly(N-acryloyl-L-proline methyl ester) and poly(N-acryloyl-4-trans-hydroxy-L-proline methyl ester), poly(methyl-2-alkylamidoacrylates) such as poly(methyl-2-propionamidoacrylate) and poly(methyl-2-isobutyracrylate), and polyoxazolines such as poly(2-ethyl-2-oxazoline), poly(2-n-propyl-2-oxazoline) and poly(2-iso-proyl-2-oxazoline).

Other LCST polymers include polysilanes and polysilynes such as poly(4,7,10-trioxaundecylsilyne) and poly(4,7,10,13-tetraoxatetradecylsilyne). A most preferred form of a thermo-responsive polymer exhibiting an LCST is poly(N-isopropylacrylamide) (PNIPAAm).

Upon raising the temperature of an aqueous solution of such LCST polymers, reversible phase separation occurs at the lower critical solution temperature (LCST). In aqueous solution at temperatures below the LCST, the polymers are present in a swollen state and have extended conformations. Above the LCST, water is released and the hydrophobic backbone and other nonpolar groups of the polymer tend to associate causing intra- and intermolecular aggregation leading to a shrunken dehydrated state. The position of the LCST depends on the type of thermo-responsive polymer and can further be tuned by varying the molecular weight of the polymer, the polydispersity index of the polymer, or through addition of inorganic salts, co-monomers or cross-linkers. In this respect, again reference is made to V. Aseyev, H. Tenhu, F. M. Winnik, Non-ionic Thermoresponsive Polymers in Water, *Adv. Polym. Sci.*, 242, 2010, pp 29-89, particularly to Table 2. Using these variables, it is within the skills of those skilled in the art to choose a thermosresponsive SRP having an LCST from a large range of temperatures, such as between 27° C. and 75° C.

Furthermore, by the addition of cross-linking agents that form intermolecular bonds between individual polymer chains, the stability of the structure can be improved in order to ensure that the material remains in solid or gel form. In the case of poly(ethyloxazolines) it has been suggested that the presence of more than 30% of a cross-linking agent (2-isopropenyl-2-oxazoline) can prevent the polymer becoming liquid on absorption of water.

For use in a climate control system, the LCST may be set to a switching temperature slightly above the highest temperatures usually encountered. Heating the material to this switching temperature causes regeneration of the material to take place. The switching temperature will nevertheless be below 100° C. as elevation to above this temperature would effectively require boiling of the water and significant energy loss. Most preferably, the LCST is between 25° C. and 70° C. more preferably between 30° C. and 50° C. In the case of PNIPAAm, this temperature is generally around 35° C.

In the case of the first embodiment according to the invention, the SRP switches from the first state to the second state in response to an electromagnetic radiation stimulus. Polymers that change state in response to an electromagnetic radiation stimulus are called light-responsive polymers or photo-responsive polymers in the art.

The term light-responsive polymer as used herein refers to polymers that can absorb water in the dark and release water upon an electromagnetic radiation stimulus. The light-responsive polymers comprise photosensitive groups that take a hydrophilic state in the dark and reversibly change to a hydrophobic state when exposed to electromagnetic radiation.

Light-responsive polymers comprising photosensitive groups that take a hydrophilic state in the dark and reversibly change to a hydrophobic state when exposed to electromagnetic radiation are known in the art. Reference is made to J. E. Stumpel, Responsive polymer photonics, PhD-thesis, Technische Universiteit Eindhoven, 2014, which is incorporated herein by reference in its entirety. Well-known light-responsive polymers comprise spiropyran groups which spontaneously open in a polar environment and in the dark to a charged merocyanine isomer. This process can be reversed by illumination of the charged merocyanine isomer with white light. The opening of the spiropyran groups to a charged merocyanine isomer in the dark can be catalysed by using an acidic medium or by using an internal proton donor in the polymer backbone such as acrylic acid. In this respect, reference is made to T. Satoh et al., Fast-reversible light-driven hydrogels consisting of spirobenzopyran-functionalized poly(N-isopropylacrylamide), *Soft Matter*, 7, 2011, pp 8030-8034, to J. E. Stumpel et al., Photoswitchable Ratchet Surface Topographies based on Self-Protonating Spiropyran-NIPAAM Hydrogels, *ACS Appl. Mater. Interfaces*, 6, 2014, pp 7268-7274, to B. Ziółkowski et al., Self-protonating spiropyran-co-NIPAM-co-acrylic acid hydrogel photoactuators, *Soft Matter*, 2013, 9, pp 8754-876, and to J. E. Stumpel et al., Stimuli-responsive photonic polymer coatings, *Chem. Commun.*, 50, 2014, pp 15839-15848, which publications are incorporated herein by reference in their entirety. Alternatively, light-responsive polymers comprising azobenzene derivatives or coumarin derivatives as photosensitive groups may be used.

As is known to the skilled person, the absorption characteristics of photosensitive groups such as spiropyran groups can be fine-tuned by substituting electron-donating or electron-withdrawing groups on the ring structure of the chromophore. See for example T. Satoh et al., Fast-reversible light-driven hydrogels consisting of spirobenzopyran-functionalized poly(N-isopropylacrylamide), *Soft Matter*, 7, 2011, pp 8030-8034 and T. Satoh et al., Isomerization of spirobenzopyrans bearing electron-donating and electron-withdrawing groups in acidic solutions, *Phys. Chem. Chem. Phys.*, 13, 2011, pp 7322-7329. It is thus within the skills of the person skilled in the art to adapt the absorption characteristics of the light-responsive polymer to a particular source of electromagnetic radiation or vice versa.

For use with spiropyran based SRPs, the electromagnetic radiation is preferably visible light. Other light responsive SRPs using different chromophores may be adapted to different areas of the EM spectrum. In one preferred embodiment, the electromagnetic radiation may have wavelengths between 250 nm and 720 nm, optionally between 350 nm and 700 nm or between 390 nm and 650 nm. As is well known, shorter wavelength light such as UV is more energetic than longer wavelength light and may in certain circumstances be preferable. On the other hand, longer wavelength light such as IR light may be better able to penetrate into the carrier of the SRP.

In another preferred embodiment according to the invention, the SRP may switch from the first state to the second state in response to both an electromagnetic radiation stimulus and a heat stimulus. Such light-responsive polymers comprising photosensitive groups that take a hydrophilic state in the dark and reversibly change to a hydrophobic state when exposed to electromagnetic radiation and which exhibit an LCST in or with water are known in the art. Such polymers are also called dual-responsive polymers. The dual-responsive polymers can absorb water vapour in the dark and release water upon an electromagnetic radiation stimulus. Moreover, since the polymers have a LCST, they may absorb water vapour below the LCST and release water above the LCST. It should be noted that the reversible switch from the first state to the second state in response to an electromagnetic radiation stimulus only works below the LCST. Moreover, it should be noted that the reversible switch from the first state to the second state in response to a heat stimulus only works in the dark.

Well-known examples of dual-responsive polymers are co-polymers of spiropyran-derivatives and N-isopropylacrylamide (NIPAAm). In these co-polymers, if the temperature is below the LCST, the spiropyran group spontaneously opens in a polar environment in the dark to a charged merocyanine isomer. This process can be reversed by illumination of the charged merocyanine isomer with white light. Hence, the co-polymer can absorb water in the dark and release water upon an electromagnetic radiation stimulus. Moreover, if the co-polymer is in the dark, it can absorb water vapour below the LCST and release water above the LCST. The opening of the spiropyran groups to a charged merocyanine isomer in the dark can be catalysed by using an acidic medium. In this respect, reference is made to R. Klajn, Siropyran-based dynamic materials, *Chem. Soc. Rev.*, 43, 2014, pp 148-184 and to T. Satoh et al., Fast-reversible light-driven hydrogels consisting of spirobenzopyran-functionalized poly(N-isopropylacrylamide), *Soft Matter*, 7, 2011, pp 8030-8034.

Other well-known examples of dual-responsive polymers are co-polymers of spiropyran-derivatives, N-isopropylacrylamide (NIPAAm) and acrylic acid. These co-polymers provide an internal proton donor such that no acidic medium is needed to catalyse the opening of the spiropyran groups to a charged merocyanine isomer in the dark. Reference is made to J. E. Stumpel et al., Photoswitchable Ratchet Surface Topographies based on Self-Protonating Spiropyran-NIPAAM Hydrogels, *ACS Appl. Mater. Interfaces*, 6, 2014, pp 7268-7274, to B. Ziółkowski et al., Self-protonating spiropyran-co-NIPAM-co-acrylic acid hydrogel photo-actuators, *Soft Matter*, 2013, 9, pp 8754-876, and to J. E. Stumpel et al., Stimuli-responsive photonic polymer coatings, *Chem. Commun.*, 50, 2014, pp 15839-15848.

In certain embodiments, the SRP is a dual-responsive co-polymer of (A) one or more of spiropyran derivatives, azobenzene derivatives and coumarin derivatives as photosensitive groups and (B) one or more of N-substituted acrylamides and N-substituted methacrylamides such as N-ethylacrylamide, N-ethylmethacrylamide, N,N'-ethylmethacrylamide, N,N'-diethylacrylamide, N-n-propylacrylamide, N-n-propylmethacrylamide, N-isopropylacrylamide, N-isopropylmethacrylamide, N-cyclopropylacrylamide, N-(L)-(1-hydroxymethyl)propylmethacrylamide, N-acryloylpyrrolidine and N-acryloylpiperidine, N-vinyl amides such as N-vinyl caprolactam, N-vinyl propylacetamide, N-vinyl-5-methyl-2-oxazolidone and N-vinyl isobutyramide, protein-related monomers such as L-proline, N-acryloyl-L-proline methyl ester and N-acryloyl-4-trans-hydroxy-L-proline methyl ester, methyl-2-alkylamidoacrylates such as methyl-2-propionamidoacrylate and methyl-2-isobutyracrylate, and oxazolines such as 2-ethyl-2-oxazoline, 2-n-propyl-2-oxazoline and 2-isoproyl-2-oxazoline.

In preferred embodiments, the SRP is a dual-responsive co-polymer of (A) one or more of spiropyran derivatives, azobenzene derivatives and coumarin derivatives as photosensitive groups and (B) one or more of N-substituted acrylamides and N-substituted methacrylamides such as N-ethylacrylamide, N-ethylmethacrylamide, N,N'-ethylmethacrylamide, N,N'-diethylacrylamide, N-n-propylacrylamide, N-n-propylmethacrylamide, N-isopropylacrylamide, N-isopropylmethacrylamide, N-cyclopropylacrylamide, N-(L)-(1-hydroxymethyl)propylmethacrylamide, N-acryloylpyrrolidine, and N-acryloylpiperidine, N-vinyl amides such as N-vinyl caprolactam, N-vinyl propylacetamide, N-vinyl-5-methyl-2-oxazolidone, N-vinyl isobutyramide, protein-related monomers such as L-proline, N-acryloyl-L-proline methyl ester, and N-acryloyl-4-trans-hydroxy-L-proline methyl ester, methyl-2-alkylamidoacrylates such as methyl-2-propionamidoacrylate and methyl-2-isobutyracrylate, oxazolines such as 2-ethyl-2-oxazoline, 2-n-propyl-2-oxazoline and 2-isoproyl-2-oxazoline and (C) acrylic acids.

In a more preferred embodiment, the SRP is a dual-responsive co-polymer of spiropyran-derivatives and N-isopropylacrylamide (NIPAAm). In an even more preferred embodiment, the SRP is a dual-responsive co-polymer of spiropyran-derivatives, N-isopropylacrylamide (NIPAAm) and acrylic acid.

The skilled person will recognise that although LCST polymers, responsive to a heat stimulus, and polymers responsive to an electromagnetic radiation stimulus have been described, other activation forms may be used to cause the material to switch from the first state to the second state e.g. in response to an electric potential, an electric current, a magnetic field, pH, vibration or mechanical stress. In the present context, reference to an SRP polymer is intended to denote a material in the broadest sense that is capable of absorbing water in a first state and releasing it in a second state, whereby transition between the two states can take place reversibly in response to an external stimulus. An important consideration is that the water can be released without requiring it to be evaporated. In general, reference will be made to absorption of moisture, nevertheless, materials that adsorb moisture are also considered to be included within the scope of this term.

According to the invention, the fibres may be any appropriate fibre on which the SRP polymer material can be coated. The fibres can be natural or synthetic and are preferably present as individual fibres rather than yarns or twines. Examples of fibres that can be used in the present invention are cellulose fibres, such as cotton fibres, carbon fibres, such as graphitic fibres, ceramic fibres and metallic fibres, although other natural and synthetic fibres and mixtures of fibres may also be used. Most preferably, the fibres comprise cotton. Furthermore, the fibrous material is preferably in the form of a non-woven, although woven materials may also be contemplated. The fibres themselves (prior to coating) may have a diameter of between 5 microns and 500 microns, preferably around 50 microns.

As indicated above, in one embodiment, the carrier comprises a fibrous material and the SRP is present as a coating on the individual fibres. In a preferred embodiment the fibrous material is coated with the SRP by grafting the SRP onto individual fibres of the fibrous material. Methods for grafting polymers onto fibrous substrates are described in the art. In this respect, reference is made to H. Yang et al., Temperature-triggered collection and release of water from fogs by a sponge-like cotton fibre, *Adv. Mater.*, 25(8), 2013, pp 1150-1154, which is incorporated herein by reference in its entirety. Yang et al. describe surface-initiated atom transfer radical polymerization to graft poly(N-isopropylacrylamide), abbreviated as PNIPAAm, onto cotton fabric. Further reference is made to U.S. Pat. No. 9,211,499 describing grafting hydrogel type polymers onto carbon fibres, ceramic fibres, metallic and semi-metallic fibres.

A primary difficulty with operating with a light responsive SRP is the ability to effectively illuminate the carrier. In a test environment, illumination of a portion of carrier with SRP applied thereto may be relatively simple but in an actual implementation, the location of the SRP within a flow channel makes illumination more difficult. This is especially the case when the carrier is relatively compact and the channel forms part of a complex flow structure. In one embodiment, the illumination arrangement may comprise light sources provided on or adjacent to the carrier for directly illuminating the SRP. These may take the form of LED's or similar solid state light sources capable of emitting light directed towards the SRP. The light sources may be tuned to a specific wavelength at which the SRP operates or may be wide-band if a narrow range is not required. In one embodiment, the SRP may be provided on a substrate formed as a plurality of finned plates as described in WO2008/055981, referenced above. The spacers between the finned plates can be provided by strips or tubes containing e.g. LED light sources.

In an alternative illumination arrangement, light guides may be provided that conduct light from outside the primary channel to a location adjacent to the SRP. Various light guides may be considered although optical fibres may be preferred. The light guide should be capable of delivering the right wavelengths required to activate the SRP. The light guides may also be implemented as spacers between finned plates as described above.

In a still further embodiment, the carrier may itself be at least partially light emitting and thus form part of the illumination arrangement. The SRP could be carried by a light emitting substrate, such as an LCD type display screen e.g. coated or laminated with a fibrous SRP layer. In another embodiment, the SRP could be coated or grafted onto optical fibres, illuminated by transmission through the fibres.

In certain embodiments, a heating provision may be provided. This may comprise any suitable provision for causing the SRP to switch from its first state to its second state. It may be in the form of a heater, a supply of heated air or even a facility to expose the device to the sun or another source of heat. In a most preferred embodiment, the heating provision comprises a resistive heating element provided on the carrier structure such as that described in WO2015/037996. The resistive heating element may comprise a carbon containing layer. Such layers are well known for providing distributed heating onto surfaces and have been used on aircraft wings, wind turbine blades and the like. Carbon black is particularly suited for this purpose although graphite may also be used. The carbon may be deposited onto the carrier structure as a thin layer, preferably by inkjet deposition whereby a particular distribution may be achieved. The carbon containing layer may thus cover certain regions of the substrate and other regions of the substrate may be free of heating elements. Alternatively the carbon containing layer may comprise a woven or non-woven material, impregnated with carbon particles. One suitable material is carbon impregnated semi-conductive non-woven tape. The carbon containing layer may be a separate layer from the substrate of fibrous material. It is however also contemplated that both layers may be integrated. The fibrous material may be itself conductive e.g. carbon fibres or may be impregnated with conductive particles, whereby resistance heating may be carried out. Alternatively, the fibrous material may comprise a mixture of fibres coated with LCST polymers and other conductive fibres serving as the heating provision. Most preferably the heating element comprises a layer having a resistance per unit length of between 100 and 800 ohms per cm.

In one form, the carrier structure may comprise a generally rectangular panel and the heating element may comprise strips extending across the panel. The strips may be selectively activated by application of a voltage across them using dedicated electrodes whereby different regions of the carrier structure may be heated independently e.g. in series. The heating element may also be present in specific regions and the specific regions may be selectively activated under the control of an appropriate controller. This may be used to permit specific heating profiles to be implemented such as saw tooth and sine wave profiles and can also be implemented to provide appropriate adaptive control based on feedback of signals such as air temperature, air humidity, carrier temperature, water content and the like. The same control may be applicable to other stimuli and the above mentioned illumination arrangements may also be independently controlled in the same way.

The invention also relates to a desiccant or dehumidification system comprising a housing having an inlet and an outlet and a device according to any preceding claim located within the housing, whereby air can flow from the inlet to the outlet over the carrier. Preferably the device is arranged to offer a relatively large surface area and relatively low flow resistance to the air passing through the housing. In particular, the carrier may be in the form of a plurality of passageways aligned with the flow direction in the manner of prior art desiccant wheels. Alternatively, open mesh and fin structures as shown in WO2008/055981, offer advantageous flow characteristics as they stimulate turbulent flow and can help to reduce overall flow resistance.

In order to provide for removal of the absorbed water, the housing may further comprise a drain or collector and a gravity flow structure leading to the drain. The water may be collected at the drain and used for any appropriate purpose; in particular, it may be used for subsequent evaporation in an evaporative cooling stage of the same or another system. The system is particularly useful in combination with an evaporative cooling device, preferably a dew-point cooler, wherein in use the flow stream is directed from the outlet to an inlet e.g. of working fluid to the evaporative cooling device. In this manner, the fluid entering the cooling device may be dehumidified in order to allow a greater uptake of moisture during cooling. The purpose of the device may also be for the collection of water e.g. in areas where water is scarce. If subsequent use so requires, antibacterial provisions may be provided such as silver ions or other appropriate sterilisation procedures. The illumination arrangement may also be designed to operate in the UV range to ensure UV sterilisation of the water, SRP, fibrous material or carrier.

According to a still further aspect of the invention, the system may further comprise a heat exchanger communicating with the outlet, whereby air leaving the outlet can flow through the heat exchanger and be cooled. This may be particularly important in compensating for the heat of absorption due to the extraction of vapour onto the surface of the carrier structure. As mentioned above, the carrier structure may also be formed of a conducting metal foil allowing direct transfer of heat to an appropriate heat sink. The invention also relates to a method of extracting entrained water vapour from a fluid stream using a device or system as described above or hereinafter, by passing a flow of humid air over the device whereby the air is in contact with the SRP and the SRP absorbs a quantity of water vapour; and selectively stimulating the SRP whereby water absorbed on the fibres is released.

Preferably the method may also optionally include cooling the flow and/or the device to remove heat such as the heat of absorption of the vapour. The method may also include collecting the released product by gravity flow to a drain.

Still further, the invention relates to a water extracting device comprising a plurality of primary and secondary channels in heat conducting relation with respect to each other and through which respective first and second media can flow; a quantity of a stimulus responsive polymer (SRP) within the primary channels, the SRP being capable of absorbing a quantity of water from the first medium in a first state and releasing the water in a second state; and a source of stimulus for selectively causing the SRP to transition between the first and second states. Such an arrangement may provide significantly greater possibilities in terms of regulation of flows within an SRP system than has hitherto been available. By maintaining a constant exchange of heat away from the primary channel, more stable conditions for the SRP may be maintained.

BRIEF DESCRIPTION OF THE DRAWINGS

The features and advantages of the invention will be appreciated upon reference to the following drawings of a number of exemplary embodiments, in which:

FIG. 1A shows a detail of the fibrous material layer of FIG. 1 in the dry state;

FIG. 1B shows a detail of the fibrous material layer of FIG. 1 in the wet state;

DESCRIPTION OF ILLUSTRATIVE EMBODIMENTS

The following is a description of certain embodiments of the invention, given by way of example only and with reference to the drawings.

Figure 1:
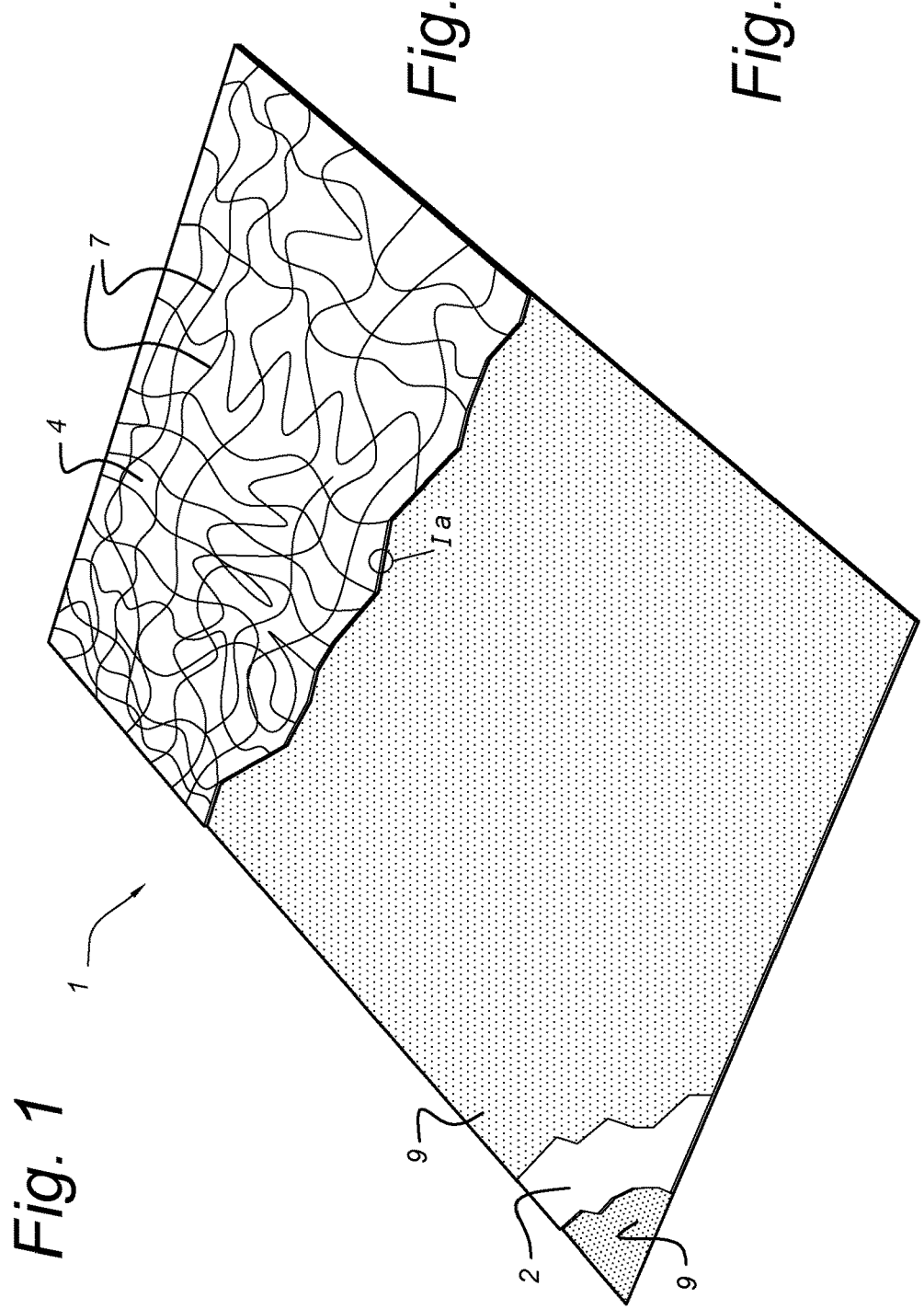
FIG. 1 shows a perspective view of a portion of an SRP laminate according to the present invention.

FIG. 1 shows a portion of an SRP laminate 1 for use in the present invention comprising a carrier layer 2 and a fibrous material layer 4. The fibrous material layer 4 comprises a plurality of individual cotton fibres 7, which in this embodiment are in non-woven form. It will be understood that the fibres 7 may also be present in any other suitable arrangement as a woven, felt, knitted fabric or the like. The carrier layer 2 is a thin foil of aluminium having a thickness of around 70 microns. It is provided on both surfaces with a protective layer 9 of polymer which is both electrically insulating and protects it from corrosion.

FIG. 1A shows a detail of the fibrous material layer 4, showing a cross section of the fibre 7. The fibre 7 has a core 8 having a thickness of around 20 microns. It is coated around its outer surface with a layer of SRP 10, which in this embodiment is a spiropyran-PNIPAAm-acrylic acid copolymer, whereby the overall thickness of the fibre 7 in the dry state is around 50 microns. The SRP 10 is applied using a surface-initiated atom transfer radical polymerization method to graft the spiropyran-PNIPAAm-acrylic acid copolymer directly onto the surface of the cotton core 8. The procedure may be as described in the article "Temperature-Triggered Collection and Release of Water from Fogs by a Sponge-Like Cotton Fabric"; Yang et al.; Advanced Materials 2013. The SRP 10 is both light and temperature responsive and is set to have a LCST of around 35° C.

FIG. 1B shows the same detail as that of FIG. 1A in the wet state in which the SRP 10 has absorbed moisture and has increased considerably in size.

Figure 2:
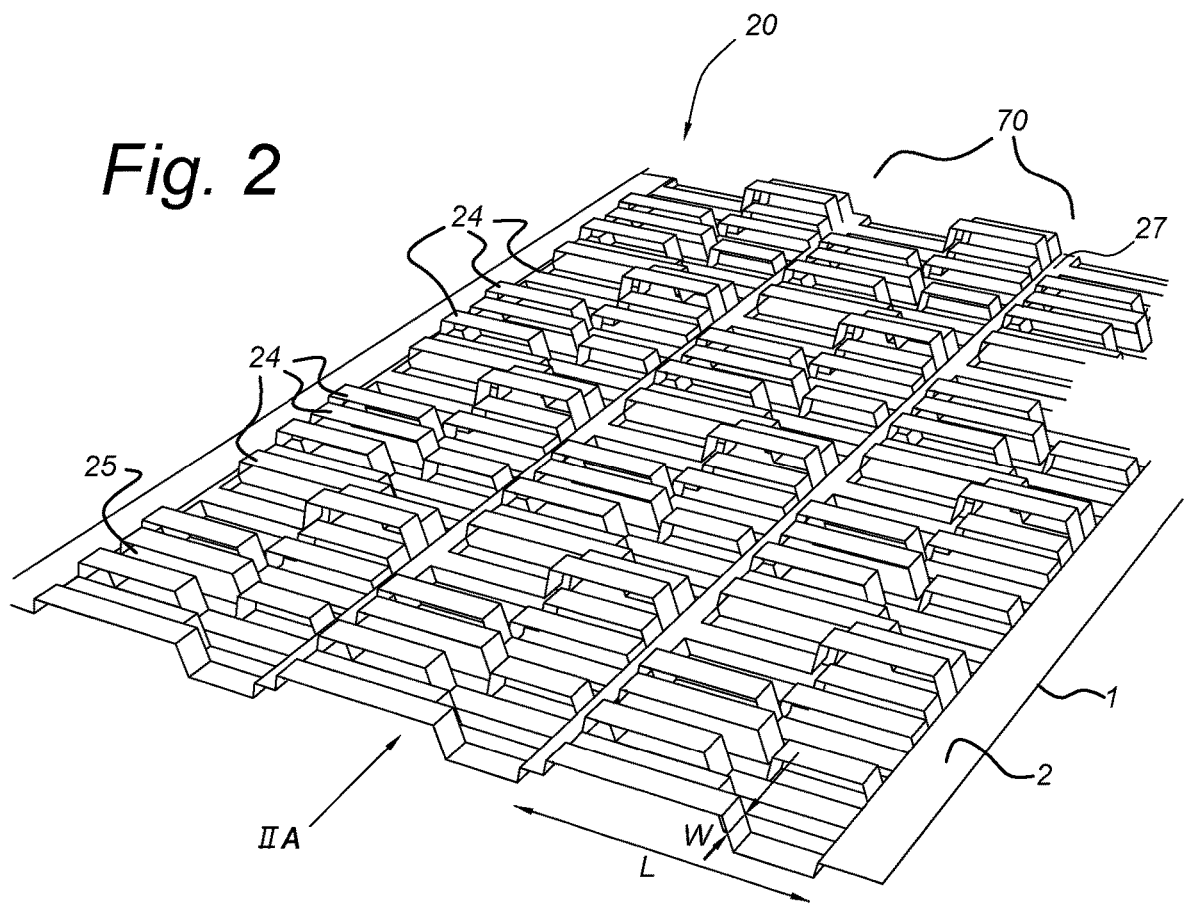
FIG. 2 shows a shape-retaining supporting structure manufactured from the laminate of FIG. 1.

FIG. 2 shows in perspective view, an embodiment of the laminate 1 of FIG. 1 that has been formed into a shape-retaining supporting structure 20 for improved operation. According to FIG. 2, the carrier layer 2 has been formed by a rolling and cutting technique into a plurality of fins or strips 24 that are partially separated from each other in the flow direction by cuts 25. The strips 24 are formed in a manner such that adjacent strips 24 protrude from a main plane of the laminate 1 by different amounts. The strips 24 begin and end at gullies 27, where the laminate is undistorted. The resulting structure 20 has an advantageous form that increases turbulence of an air flow across it whereby better moisture transport may be achieved. In the present embodiment, the strips 24 each have a length L of around 20 mm and a width W of around 2 mm. Nevertheless, the skilled person will understand that other configurations may also be used. Furthermore, although not shown, it will be understood that the carrier layer 2 is laminated with a fibrous material layer 4 and a protective layer 9 as described in relation to FIG. 1. The lamination of these layers is sufficient to ensure that they will remain attached during the forming process.

Figure 2A:
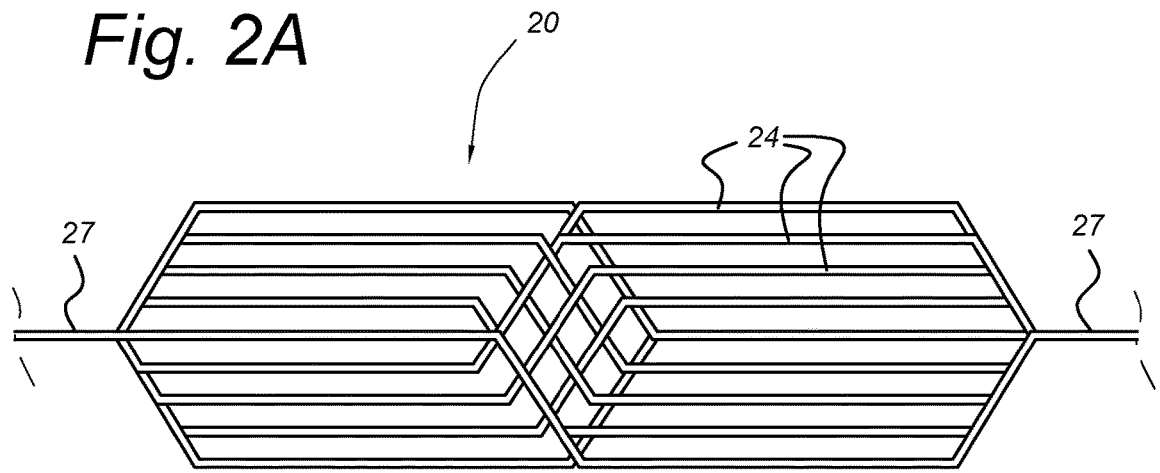
FIG. 2A is a view of a portion of the device of FIG. 2 taken in direction A.

Advantageously, each strip 24 is formed to have the same overall length which prevents distortion of the laminate 1 during the forming process. FIG. 2A is a detail of a portion of the device 20 taken in direction A in FIG. 2, indicating the shape of the strips 24 and the location of the gullies 27.

Figure 3:
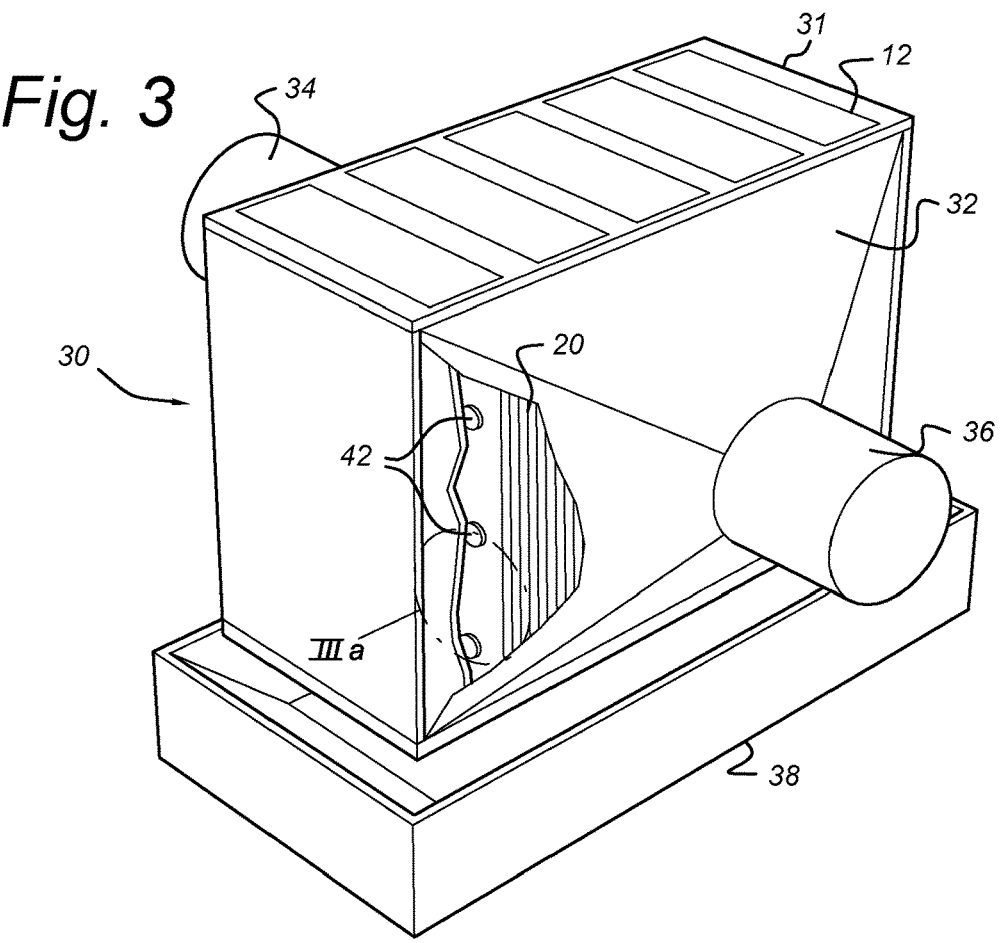
FIG. 3 shows a water extracting device comprising a plurality of the devices of FIG. 2.

FIG. 3 shows a practical example of how the structure 20 of FIG. 2 could be implemented as a water extracting device 30 according to the present invention. The device 30 comprises a housing 31 defining a flow channel 32 and having an inlet 34 and an outlet 36. Within the flow channel 32, a plurality of structures 20 as disclosed in FIG. 2 are located in spaced parallel relation with spacers 42 located between adjacent structures 20. At the lower side of the channel 32 is a collector 38. Light sources 12 are shown at the upper side of the housing 31, directed to illuminate the interior of the channel 32 and the surfaces of the structures 20 including the fibrous material layer 7 and the SRP 10.

Figure 3A:
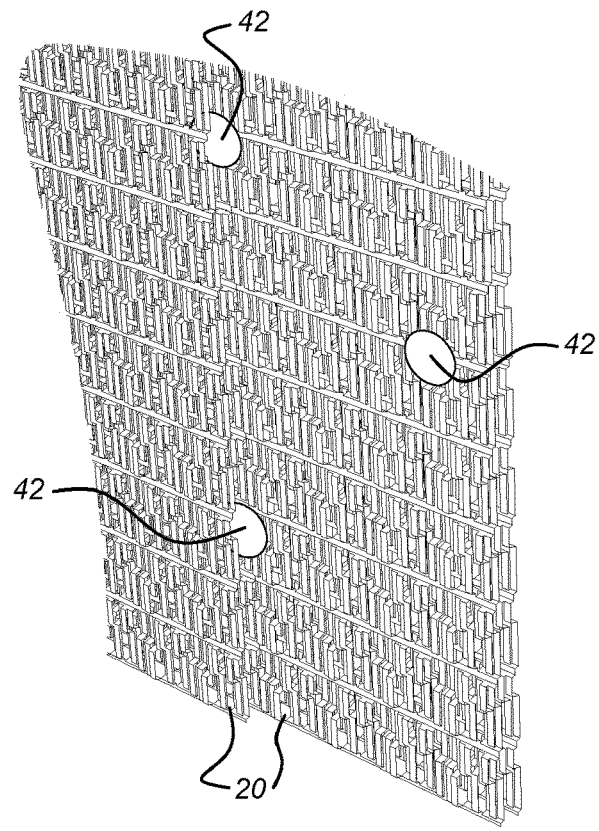
FIG. 3A shows a detail of the device of FIG. 3.

FIG. 3A shows a detail of the device 30 illustrating the orientation of the respective shape-retaining supporting structures 20 and showing spacers 42 between adjacent shape-retaining supporting structures 20 to hold them apart.

FIGS. 4A to 4D illustrate schematically the operation of the device 30 according to FIG. 3. In the situation depicted in FIG. 4A, the light source 12 is switched off and the temperature in the primary channel is below the LCST. A flow of humid air P is circulated through the primary channel 32 over the shape-retaining supporting structures 20. The SRP 10 is thus exposed to the moisture in the air flow P and absorbs moisture, whereby the SRP 10 swells to the state as depicted in FIG. 1B.

Figure 4A:
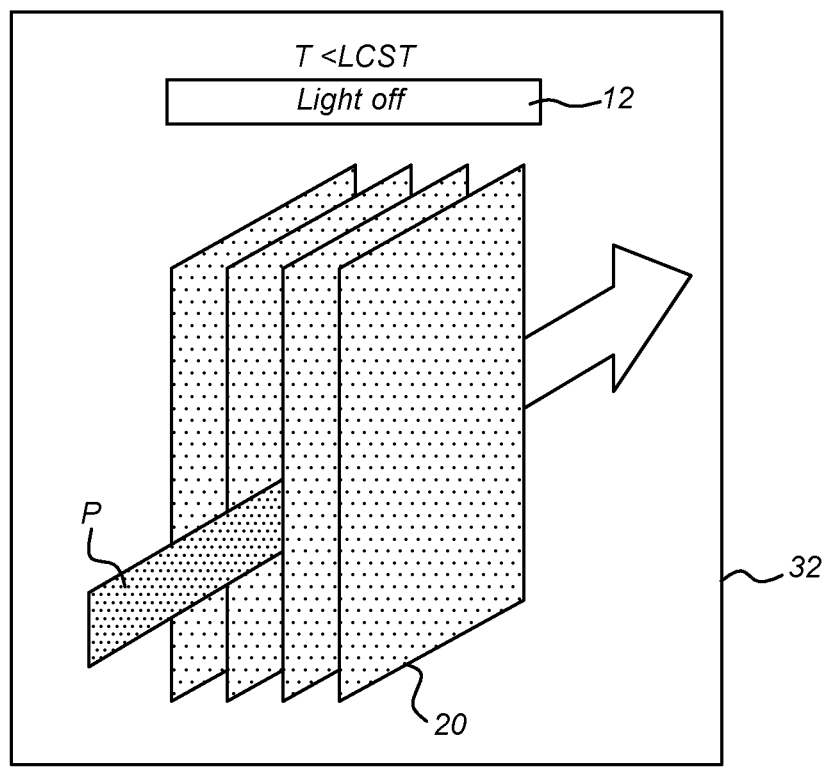
FIGS. 4A to 4D schematically illustrate operation of the device of FIG. 3.
Figure 4B:
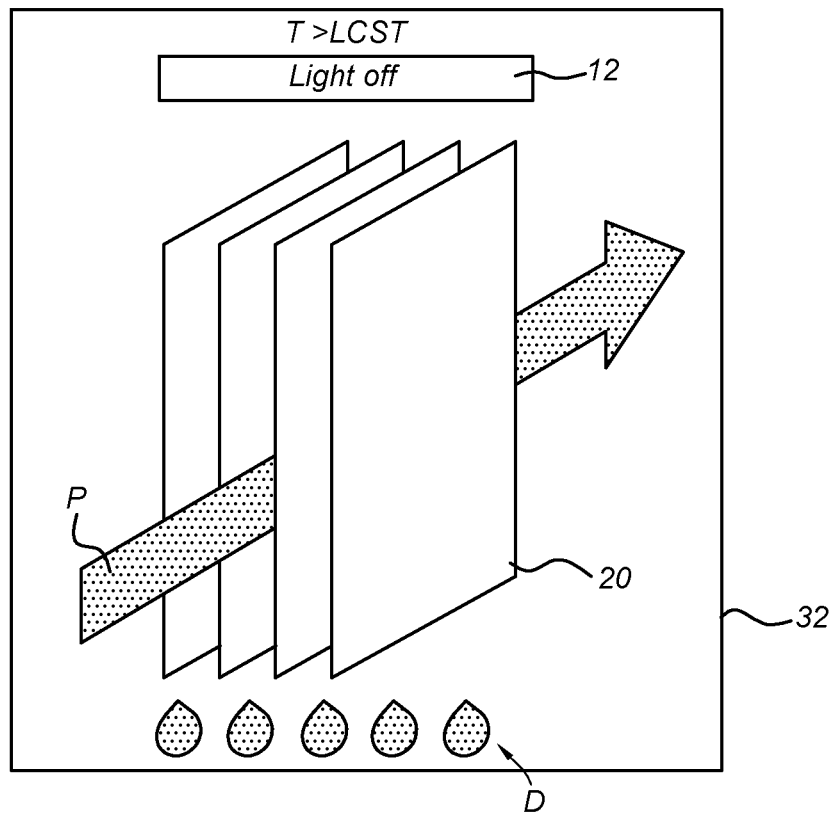
Figure 4C:
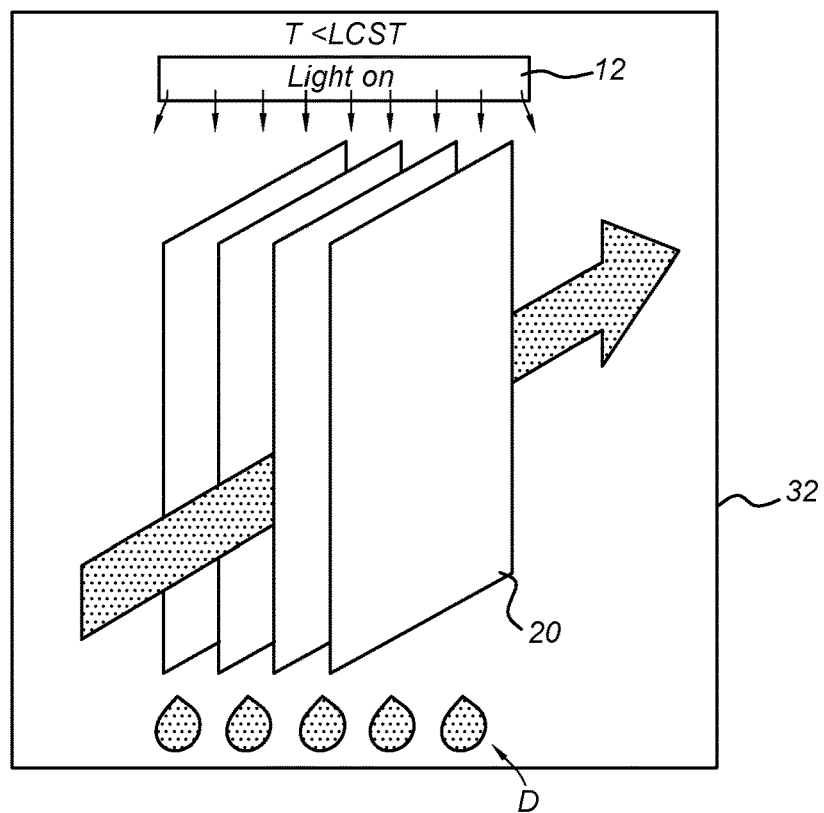
Figure 4D:
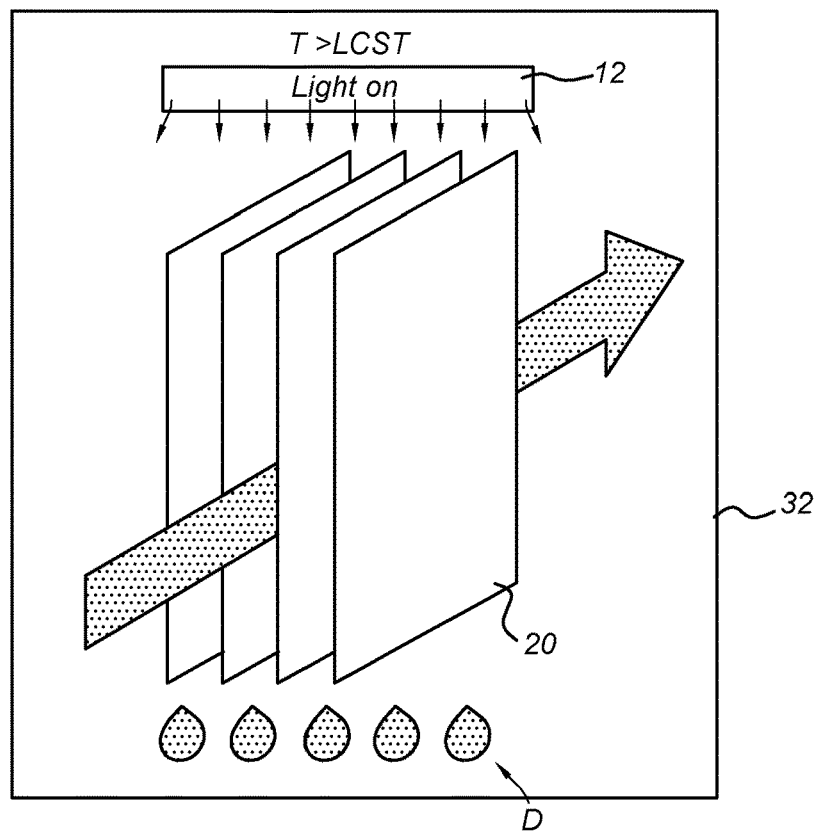

When the SRP 10 can absorb no further moisture, the device 30 must be regenerated. FIGS. 4B to 4D illustrate three options by which regeneration can be achieved. According to FIG. 4B, the temperature in the flow channel 32 is elevated to above the LCST. This causes the SRP 10 on the shape-retaining supporting structures 20 to switch from the first state to the second state whereby water droplets D are released and can be collected by the collector 38. Temperature increase may be achieved by heating elements such as disclosed in WO2015/037996 or otherwise. During regeneration, the flow P may be stopped or continued as desired and may also be used for the purpose of elevating the temperature to cause the regeneration.

In FIG. 4C, the temperature in the primary channel 32 is maintained below the LCST. In this case, regeneration takes place by actuating the light source 12 to illuminate the fibrous material layer 7, whereby the SRP 10 switches from the first state to the second state, releasing water droplets D. In the situation depicted in FIG. 4D, both heat and light are used to regenerate the SRP 10. Because the SRP 10 is both sensitive to heat and light, either or both of these stimuli is sufficient to cause regeneration.

Figure 5:
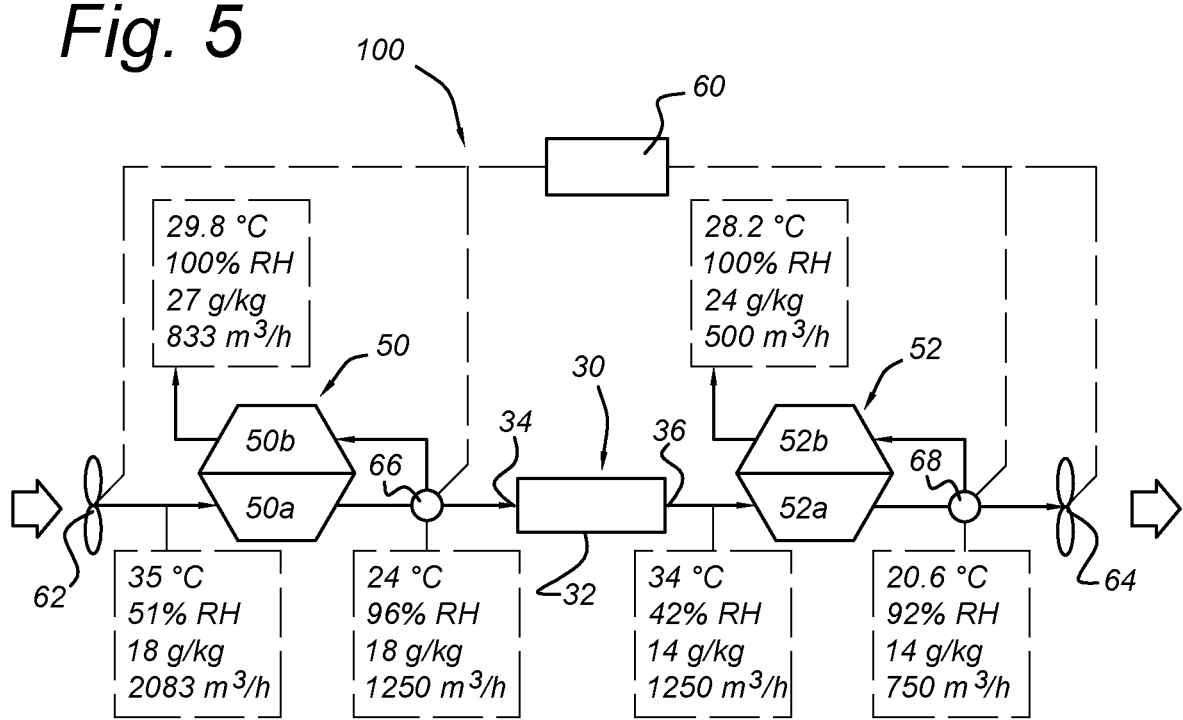
FIG. 5 shows schematically an air handling circuit according to an embodiment of the invention.

According to FIG. 5, there is shown an embodiment of the invention in which the device 30 of FIG. 3 is incorporated into an air handling circuit 100. The device 30 is placed in series between a first indirect evaporative cooler 50 and a second indirect evaporative cooler 52. The indirect evaporative coolers 50, 52 have primary 50a, 52a and secondary 50b, 52b channels, being in heat conducting relation with each other and whereby at least the secondary channels 50b, 52b are provided with a supply of water. The indirect evaporative coolers 50, 52 are of the type disclosed in WO2008/055981 although other similar evaporative cooling devices may be used such as that shown in WO03/091633. A controller 60 is operatively connected to an inlet fan 62, an outlet fan 64 and first 66 and second 68 bypass valves. Sensors (not shown) for temperature, humidity, flow rate and any other relevant parameters are provided at appropriate locations in the circuit to provide feedback of flow conditions to the controller 60. In a prophetic flow configuration and with reference to FIG. 5, the controller 60 is implemented to take fresh outdoor air having temperature of 35° C. and 18 g/Kg water with a relative humidity (RH) of 51% and deliver it at a flow rate of 2083 m³/h to the primary channel 50a. The air is cooled down to close to the dew point at the outlet of the primary channel 50a by a bypass flow through the secondary channel 50b as is conventional for dewpoint coolers. The first bypass valve 66 is controlled to allow a flow of 833 m³/h through the secondary channel 50b, which is humidified by addition of water and exits with a temperature of 29.8° C. and 27 g/Kg water at 100% RH. The net flow leaving the first indirect evaporative cooler 50 is 1250 m³/h, having a temperature of 24.0° C., 18 g/Kg water and relative humidity of 96%. This flow is supplied to the inlet 34 of the device 30 for extracting water. As the air flows over the structures 20 located within the housing 32, because the temperature is below the LCS temperature, water is absorbed by the SRP. The air exits the housing 32 through the outlet 36 with just 14 g/Kg water and a relative humidity of 42%. Due to the heat of absorption, the temperature of the air stream has increased adiabatically to 34.0° C., which is still below the LCST.

On leaving the outlet 36 of the device 30, the air is supplied to the primary channel 52a of the second indirect evaporative cooler 52. Here again, a bypass flow is directed by second bypass valve 68 through the secondary channel 52 where it is wetted by addition of water, causing cooling of the air flow in the primary channel 52a to close to the dewpoint. A secondary flow of 500 m³/h is bypassed via the secondary channel 52b and exits at 28.2° C. with 24 g/Kg water at 100% RH. The net flow leaving the second indirect evaporative cooler 52 is 750 m³/h having a temperature of just 20.6° C. and 14 g/Kg water with 92% RH. This may be delivered e.g. to a habitable space. It will be understood that the first evaporative cooler 50 serves to maintain the system 30 below the LCST, while the second evaporative cooler 52 utilises the low humidity air in a further cooling process.

Periodically, the SRP material in the device 30 becomes saturated. At this time, the controller 60 operates to activate the light sources 12 to illuminate the fibrous material layer 7, whereby the SRP 10 switches from the first state to the second state. The SRP 10 releases the absorbed water, which drips down into the collector 38 from where it can be collected e.g. for use in the evaporative coolers 50, 52.

Figure 6:
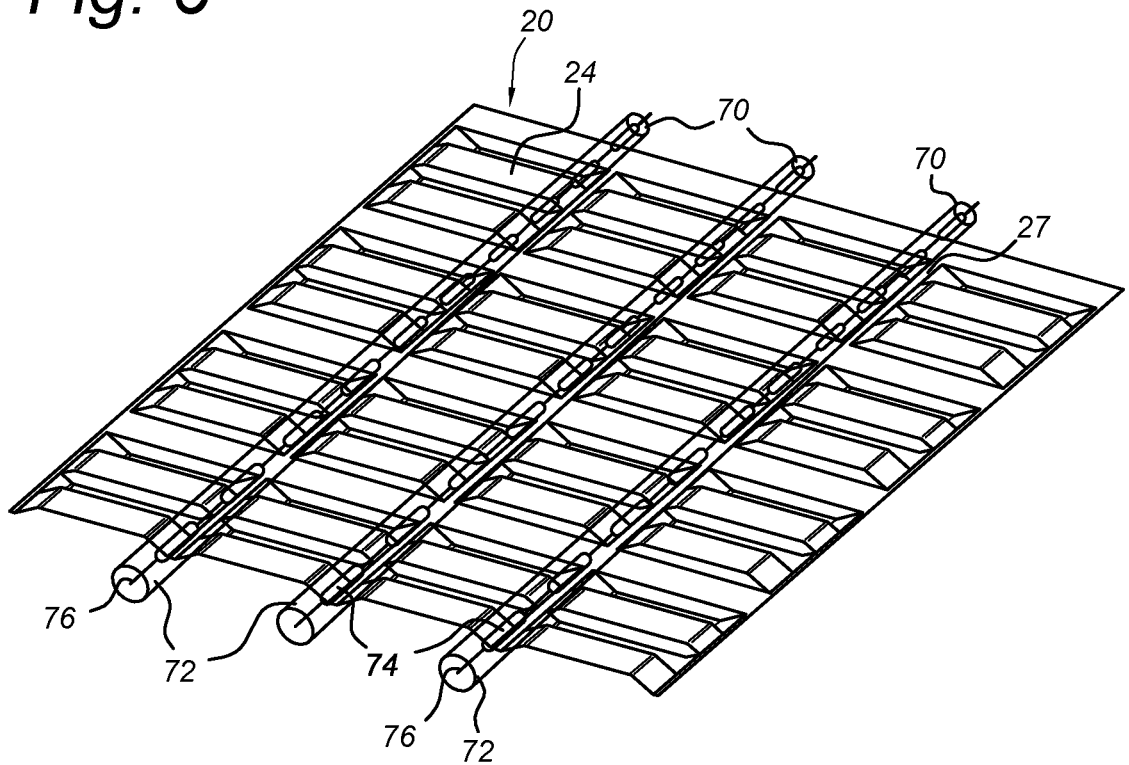
FIG. 6 shows in perspective view a supporting structure according to an embodiment of the invention.

FIG. 6 shows an alternative arrangement in which the shape-retaining supporting structure 20 of FIG. 2 is provided with an illumination arrangement in the form of light emitting spacers 70. The light emitting spacers 70 are positioned within the gullies 27 between the strips 24. They comprise a transparent tubular body 72 with embedded LED lights 74 spaced along the length of the tubular body 72, provided with electrical connections 76. The LEDs 74 may be chosen to give narrow spectrum illumination at the wavelength most suitable for the SRP 10. The tubular body 72 is also transmissive to light energy in this region of the spectrum. The arrangement of FIG. 6 may be used in the water extracting device 30 of FIG. 3 and in the air handling circuit 100 of FIG. 5. Electrical connections 76 can be connected to an appropriate source of energy e.g. via controller 60.

Figure 7:
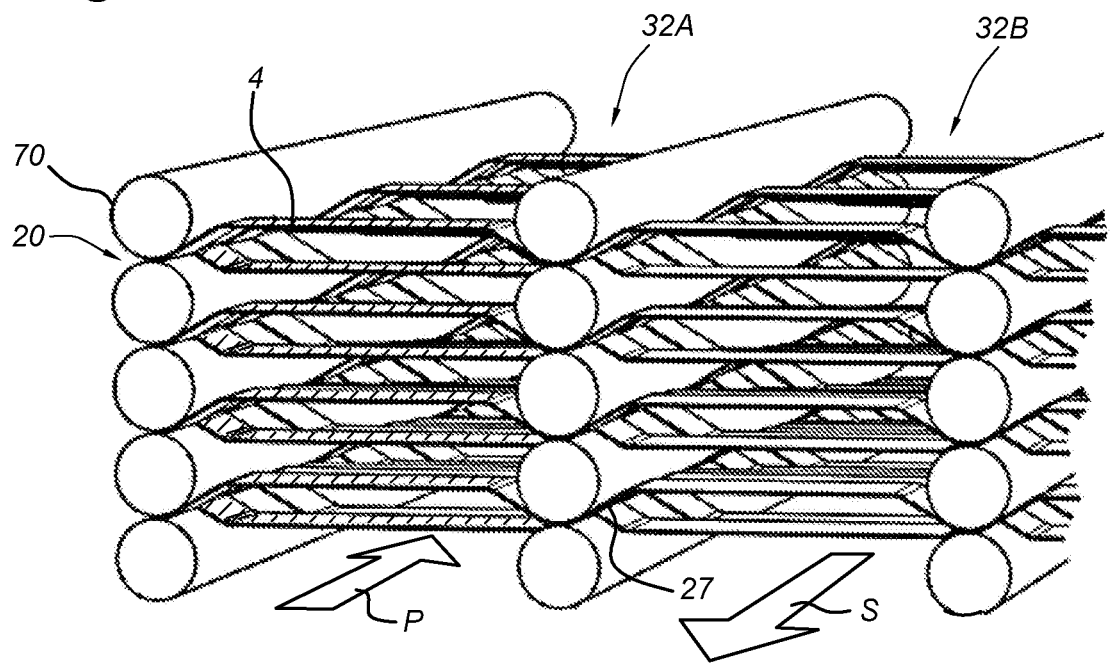
FIG. 7 shows a plurality of structures according to FIG. 6 stacked together to form first and second channels.

FIG. 7 shows in perspective view how a plurality of structures 20 according to FIGS. 2 and 6 may be stacked together with spacers 70 located between adjacent structures 20. The structures 20 could be installed and operate in the device of FIG. 3 or the circuit of FIG. 5 as indicated above, whereby a single flow channel is present and all of the media flows through the same flow channel between inlet and outlet. An important advantage of the configuration of FIG. 7 is that the spacers 70 engage together and can to form a primary channel 32A and a secondary channel 32B. Although not shown, an adhesive may be provided between the spacers 70 and the gullies 27 to ensure sealing. Alternatively, the spacers can engage mechanically e.g. with a form-fit or merely be pressed together by an external force. The channels 32A, 32B may be used to provide for circulation of first P and second S media flows in heat exchanging relation to one another either in counter flow or in cross flow. Appropriate manifolds (not shown) may be provided to connect with inlets and outlets to the channels 32A, 32B. This configuration has been shown in earlier publications such as WO2008/055981 to be extremely efficient in terms of transferring heat between primary and secondary channels.

Furthermore, according to FIG. 7, it is noted that the fibrous material layer 4 is only present in the primary channel 32A. In this way, a flow of humid air transported through the primary channel 32A can give up its moisture to the SRP 10 on the fibres 7 of the fibrous material layer 4. The latent heat of absorption can then be conducted through the aluminium carrier layer 2 to the secondary channel 32B, where it can be imparted to a flow of air through that channel. This provides significantly greater possibilities in terms of regulation of flows within an SRP system than has hitherto been available. By maintaining a constant exchange of heat away from the primary channel, more stable conditions for the SRP 10 may be maintained.

Figure 8:
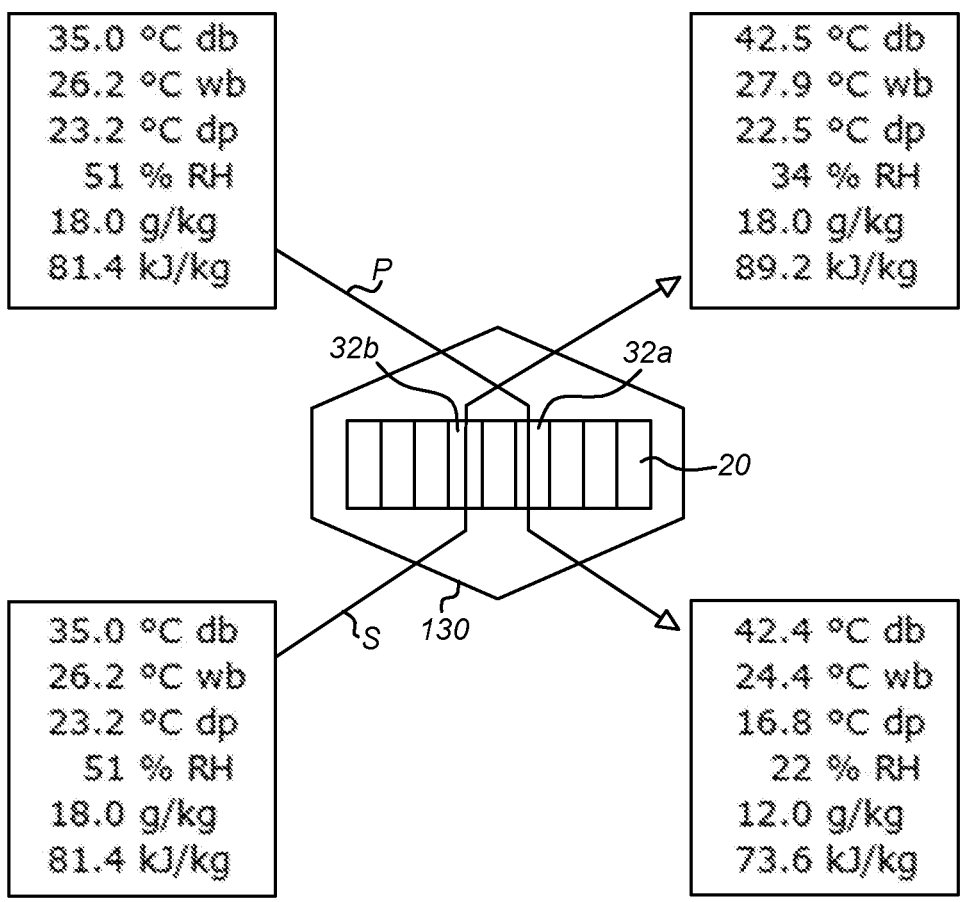
FIGS. 8 to 10 are schematic representations of a water extracting device according to a second embodiment of the invention in operation between first P and second S media flows.

FIG. 8 shows a schematic representation of a water extracting device 130 according to a second embodiment of the invention in operation between first P and second S media flows. The water extracting device 130 comprises a plurality of structures 20 in the configuration of FIG. 7 forming a plurality of primary channels 32A and secondary channels 32B. In the embodiment shown, the SRP is chosen to have an LCST temperature of 50° C. Both the first media flow P and the second media flow S are provided by ambient air having a temperature of 35° C. and an absolute humidity of 18 g/Kg. This is representative of a hot relatively dry daytime temperature. In the primary channels 32A, the SRP 10 absorbs moisture from the air, which according to the present prophetic embodiment amounts to an amount of 6 g/Kg. Application of an iterative computational model to the device 130, based on an existing heat exchanger of the same construction and equal flows in both the primary and secondary channels 32A, 32B, predicts that the temperature of the air in the secondary channel 32B would rise to 42.5° C. at the outlet of the secondary channel based on heat transmission of the latent heat of absorption from the primary channel 32A to the secondary channel 32B. The first media flow P would also outlet with a similar temperature of 42.4° C. but with a much lower relative humidity. For the sake of clarity, the suffixes db, wb and dp relate to the dry bulb, wet bulb and dewpoint temperatures. Although not provided here, it will be understood that a greater volume of air may be passed through the secondary channel 32B relative to the primary channel 32A in order to limit the temperature rise. This might be the case if the LCST of the SPR is approached during use.

Figure 9:
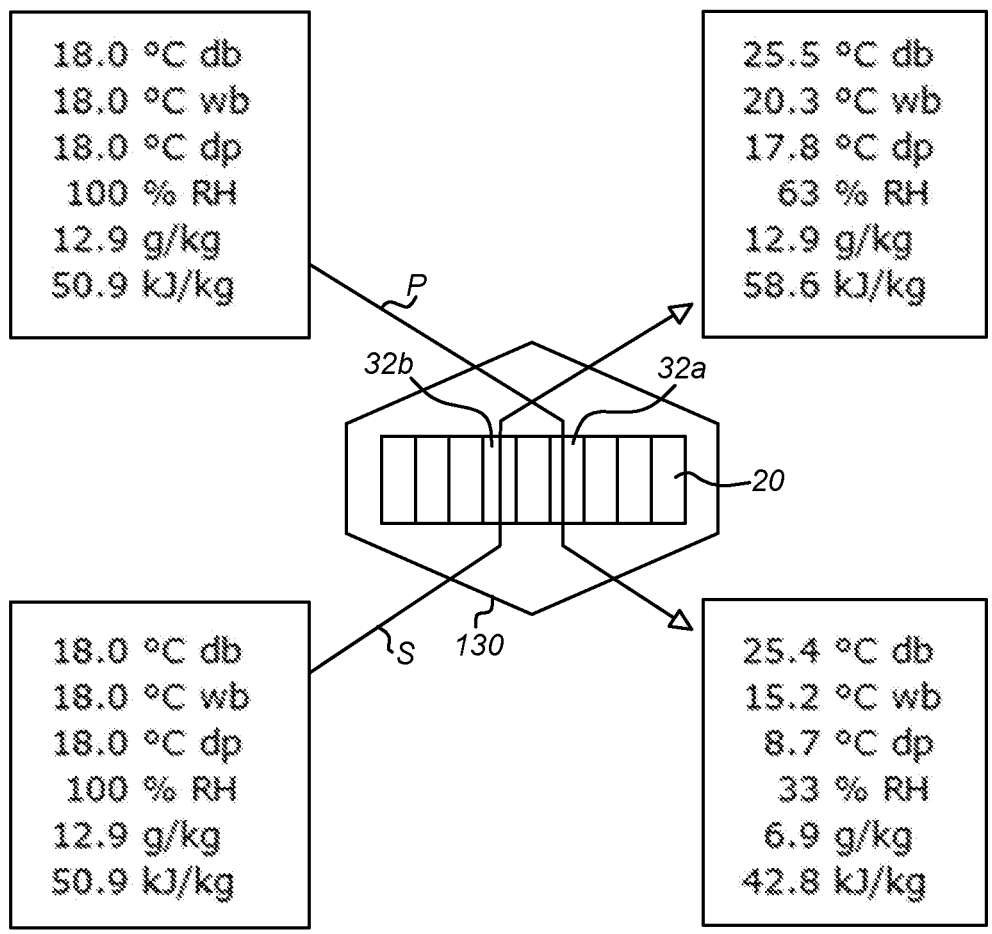

FIG. 9 shows the device 130 of FIG. 8 in operation under night-time conditions with equal flows through the primary and secondary channels 32A, 32B. In this embodiment, the ambient air has cooled to the dewpoint at 18° C. with an absolute humidity of 12.9 g/Kg. This air is used for both the first P and second S media flows. Under these conditions, the primary channel 32A is presumed to absorb a similar amount of moisture, namely 6 g/Kg. Implementation of the computational model predicts that the temperature at the outlet of the secondary channel will rise to 25.5° C. with a relative humidity of 63%. The outlet of the primary channel has also risen to 25.4° C. Such an arrangement may thus be used to extract water from the relatively humid air in the night time, while at the same time providing additional heat to a building. It will be noted that the extracted water may subsequently be used in the daytime for the evaporative cooling of the building. A device 130 could be powered by solar energy and be autonomous in that no further water supply would be needed.

Figure 10:
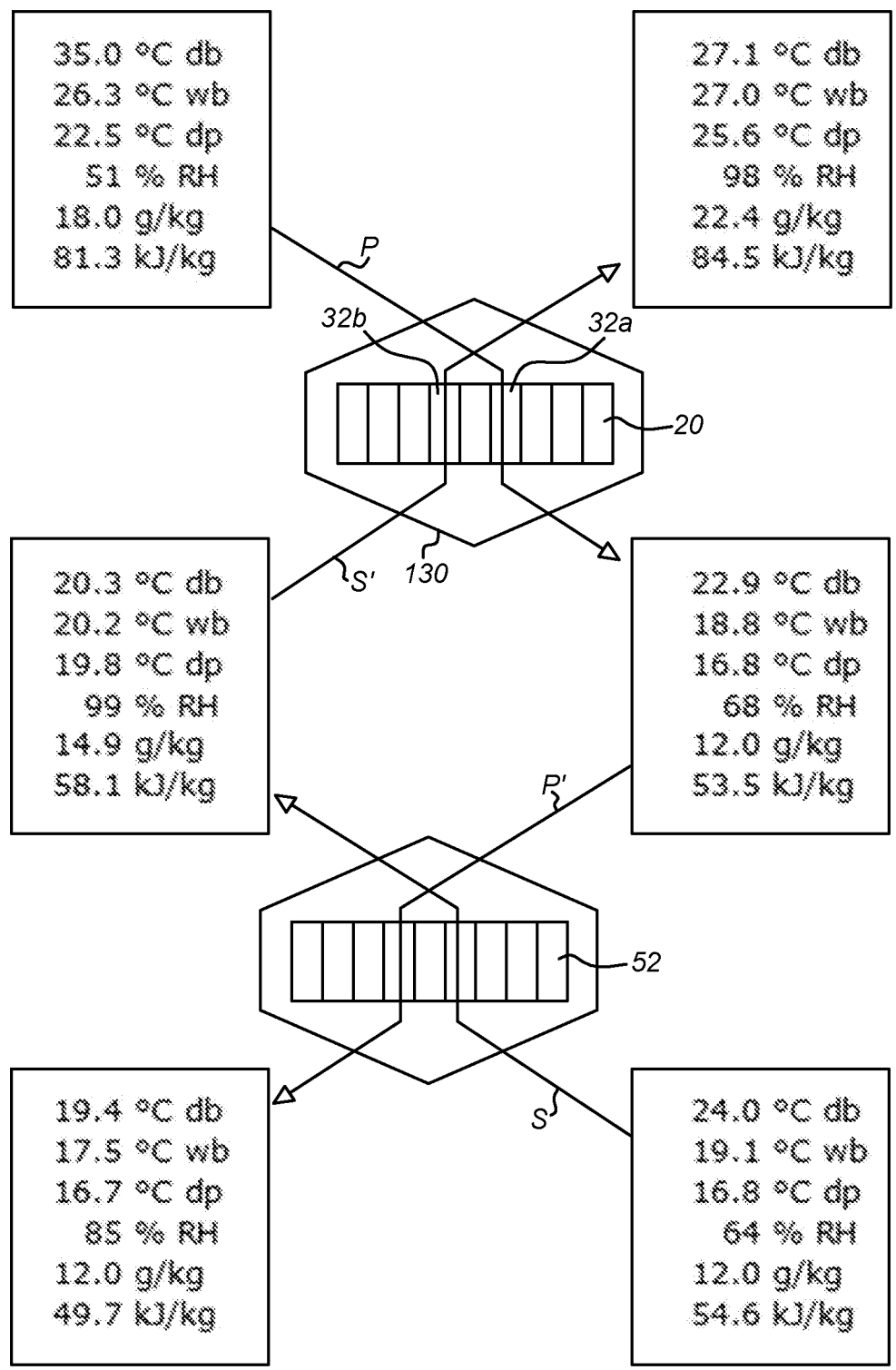

Another arrangement is shown in FIG. 10 in which the device 130 of FIG. 8 is used in series with a conventional indirect evaporative cooler 52 of FIG. 5. In this embodiment, ambient air P enters the primary channel of the device 130 under the same day-time conditions as in FIG. 8. In this case, the second flow S of medium is taken from the interior of a building or dwelling at a temperature of 24° C. and absolute humidity of around 12 g/Kg. This second flow S is applied to the wet secondary channel of indirect evaporative cooler 52, which is moistened by application of water to the secondary channel, causing the air to exit, fully saturated at a temperature of 20.3° C. This air is subsequently applied as a second flow S' to the secondary channel 32B of device 130 in order to cool the primary channel 32A, where absorption of moisture on the SRP is taking place. The dried first flow P, exits the primary channel 32A with an absolute humidity of 12 g/Kg and can be used as a first flow P' to the primary channel of the indirect evaporative cooler 52. By heat exchange with the second flow S undergoing evaporative cooling in the secondary channel of indirect evaporative cooler 52, the first flow P' exits with a temperature of 19.4° C. and can be delivered to the habitable space.

Thus, the invention has been described by reference to the embodiment discussed above. It will be recognized that this embodiment is susceptible to various modifications and alternative forms well known to those of skill in the art. In particular, various alternative flow schemes and distributions may be envisaged based on the devices and systems shown in FIGS. 5 and 8-10 above. Many modifications in addition to those described above may be made to the structures and techniques described herein without departing from the spirit and scope of the invention.

Accordingly, although specific embodiments have been described, these are examples only and are not limiting upon the scope of the invention.

The invention claimed is:
1. A water extracting device comprising:
   a primary channel for passage of a water transporting medium;
   a quantity of a stimulus responsive polymer (SRP) supported on a carrier within the primary channel, the SRP being light responsive and capable of absorbing a quantity of water from the medium in a first state and releasing the water in a second state; and
   an illumination arrangement allowing selective exposure of the SRP within the primary channel to electromagnetic radiation to switch the SRP between the first state and the second state whereby water absorbed by the SRP is released, wherein the illumination arrangement comprises light guides that conduct light from outside the primary channel to a location adjacent to the SRP, or the carrier is at least partially light emitting and is integrated with the illumination arrangement.

2. The device as claimed in claim 1, wherein the carrier comprises a fibrous material and the SRP is present as a coating on the individual fibres.

3. The device as claimed in claim 1, wherein the carrier comprises a shape-retaining supporting structure; and
   wherein the supporting structure comprises a plurality of fins over which the water transporting medium can flow and the SRP is provided on the fins.

4. The device according to claim 1, further comprising means to conduct heat from an interior of the primary channel to an exterior of the channel.

5. The device according to claim 1, wherein the SRP is applied to the carrier by grafting the SRP onto individual fibres of the fibrous material.

6. The device according to claim 1, wherein the SRP is also temperature responsive, whereby transition to the second state takes place either by exposure of the SRP to electromagnetic radiation or by increasing the temperature to above a lower critical solution temperature (LCST); and
   wherein the SRP is a co-polymer of spiropyran-derivatives, N-isopropylacrylamide (NIPAAm) and acrylic acid.

7. A system comprising a housing having an inlet and an outlet and a device according to claim 1 located within the housing, whereby a medium to be dehumidified can flow from the inlet to the outlet through the primary channel.

8. The system according to claim 7, wherein the housing further comprises a drain and a gravity flow structure leading to the drain.

9. The system according to claim 7, further comprising a heat exchanger communicating with the outlet, whereby air leaving the outlet can flow through the heat exchanger and be cooled.

10. The system according to claim 7, comprising a plurality of primary channels and further comprising a plurality of secondary channels extending between a secondary inlet and a secondary outlet and in heat conducting relation with the primary channels, whereby heat produced in the primary channels may be conducted to the secondary channels.

11. The system according to claim 7, in combination with an evaporative cooling device, whereby water extracted from the medium in the water extracting device is supplied to the evaporative cooling device for evaporation into an air flow.

12. A method of extracting water from a water transporting medium comprising:
   providing a device according to claim 1;
   passing a flow of water transporting medium over the device while the SRP is in the first state, whereby the medium is in contact with the SRP and the SRP absorbs a quantity of water; and
   subsequently switching the SRP from the first state to the second state whereby water absorbed by the SRP is released.

13. The method as claimed in claim 12, further comprising:
   cooling the flow and/or the device to remove the heat of absorption of the vapour;
   collecting the released water by gravity flow to a drain; and
   using the collected water in an evaporative cooling device.

14. A water extracting device comprising:
   a plurality of primary and secondary channels in heat conducting relation with respect to each other and through which respective first and second media can flow;
   a quantity of a stimulus responsive polymer (SRP) within the primary channels, the SRP being capable of absorbing a quantity of water from the first medium in a first state and releasing the water in a second state;
   a source of stimulus for selectively causing the SRP to transition between the first and second states, and
   a plurality of spaced, parallel conducting foils stacked together; wherein the SRP is provided on a fibrous material layer laminated to the conducting foils in the primary channels;
   and wherein the conducting foils are cut and formed into a plurality of fins.

15. The device according to claim 14, comprising spaced, parallel conducting foils wherein a space between the foils is divided by spacers into adjacent, parallel, primary and secondary channels; and
   wherein the spacers comprises a light source.

16. A method of extracting water from a water transporting medium, the method comprising:
   passing the water transporting medium through a primary channel containing a quantity of a stimulus responsive polymer (SRP) in a first state whereby it absorbs water vapour from the medium;
   conducting heat from the primary channel to a secondary channel, adjacent to and in heat conducting relation with the primary channel;
   passing a second medium through the secondary channel to remove heat therefrom; and
   periodically regenerating the SRP to remove absorbed water by applying a stimulus to the SRP to cause it to transition from the first state to a second state.

* * * * *